June 30, 1925.  1,543,724

F. T. ROBERTS ET AL

FOOTBALL

Original Filed April 16, 1923

Inventors,
Fred Thomas Roberts
William E. Roberts
By Baker, Macklin, Goldrick & Pearce
Attorneys Patented June 30, 1925.

1,543,724

UNITED STATES PATENT OFFICE.

FRED THOMAS ROBERTS AND WILLIAM E. ROBERTS, OF YONKERS, NEW YORK, ASSIGNORS TO PARAMOUNT RUBBER CONSOLIDATED, INC., OF TUCKAHOE, NEW YORK, A CORPORATION OF DELAWARE.

FOOTBALL.

Original application filed April 16, 1923, Serial No. 632,227. Divided and this application filed September 20, 1924. Serial No. 738,827.

*To all whom it may concern:*

Be it known that we, FRED THOMAS ROBERTS and WILLIAM E. ROBERTS, citizens of the United States, residing at Yonkers, in the county of Westchester and State of New York, have invented a certain new and useful Improvement in a Football, of which the following is a full, clear, and exact description, reference being had to the accompanying drawings.

The present invention relates to hollow rubber articles and has for its object the provision of a durable and satisfactory football, soccer ball, or similar ball of rubber, which shall have the appearance of the usual leather casing of such an article, and which may be cheaply and economically manufactured by a simple and efficient process.

Hollow rubber articles containing internal pressure, may be made by various processes, but to supply the demand for rubber footballs, it is necessary that they shall have the weight, appearance, balance, resiliency, and a surface as nearly similar to the usual football as practicable. Rubber when wet being intrinsically more slippery than leather it is desirable in making the rubber surface, which shall have the appearance of leather, that it shall be slightly rougher than if it were a true imitation of leather, in order that it may be readily gripped, and that slipping of the fingers when catching, throwing, or passing the ball may be avoided. A foot ball made in accordance with our invention has this characteristic.

The means for carrying out our invention are hereinafter fully described and claimed. They are also described in our application, Serial No. 632,227, filed April 16, 1923, of which the present application is a division. Briefly our copending application describes and claims an apparatus and method for making the article set forth herein. In the form illustrated this apparatus comprises a pair of cooperating molds in which two sheets of raw rubber stock are seated by vacuum, and thereafter joined to form a biscuit. A valve member is embedded in one of the sheets of rubber, and the parts are vulcanized.

Figure 1:
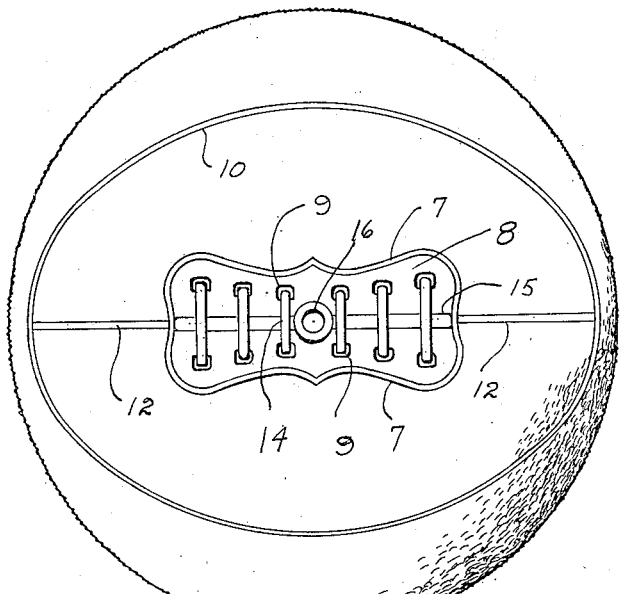
Figure 3:
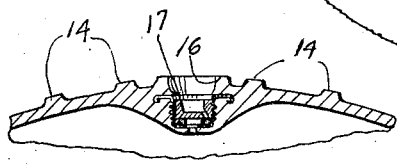
Figure 2:
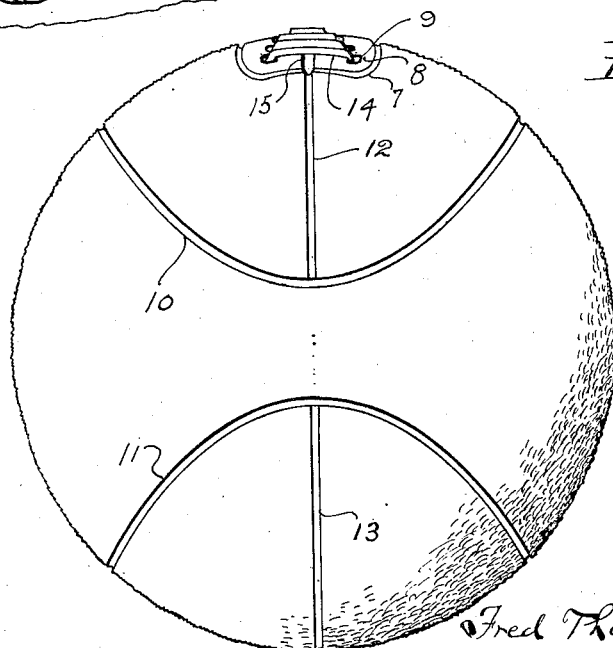

In the drawings of this application, Fig. 1 is a plan view of a completed inflated football; Fig. 2 is a side elevation of the football illustrated in Fig. 1; Fig. 3 is a sectional detail showing the valve in place within the rubber; and Fig. 4 is an enlarged sectional detail illustrating the roughened surface of the ball.

In the accompanying drawings, the football is illustrated as a spherical body comprising a single section of tough yet resilient rubber, the wall of which is divided into gores by grooves formed in the outer surface thereof. This provides an appearance similar to the usual football. The grooves shown on the ball, designated 10 and 11, may be divided by transverse grooves 12 and 13 respectively. At the juncture of two of the apparent gores, the ball is given the appearance of the lacing openings by grooves 7 which are looped to define the space usually occupied by rubber inserts. Depressions 9 may be used to indicate the usual openings through which the lacings extend. This lacing is represented by ribs of rubber 14, connecting the apparent openings as shown. A somewhat larger groove 15 represents the space between the two apparent gores 8, while integral with the wall of rubber is a tubular portion 16 forming a well for a valve, which is indicated generally at 17, Fig. 3.

Figure 4:

For convenience in illustration, the surface in Figs. 1 and 2 is simply indicated as roughened or irregular while the enlarged view in Fig. 4 is intended to show more clearly at 18 the actual appearance of the surface upon the wall portion of the ball. This surface generally appears to be a finish of leather, but the fine grooves and hair depressions of the natural leather are represented by projections, because the natural surface is as a matter of fact a reversal of the surface formed in the pattern. The manner of forming the surface is fully set forth in our copending application heretofore referred to.

From the foregoing description, it will be seen that we have provided an article which has a very close resemblance to a leather football, provided with the usual rubber bladder, while being much cheaper. It will also be apparent that the material selected for the rubber is such that the ball will be resilient and can be colored substantially the color of tanned pigskin, thus closely resembling the usual football.

Having thus described our invention, we claim:

1. As a new article of manufacture, a one-piece rubber football having a surface imitative of leather.

2. A football having an integral rubber wall adapted to contain internal pressure and having its exterior surface imitative of leather, and means for enabling the pressure within the ball to be varied selectively.

3. A football having an integral rubber wall, adapted to contain internal pressure and having an imitation of leather gores and other characteristics of a leather football.

4. A football of the character described, consisting of a single hollow rubber article whose walls are resilient and tough and impervious and having minute projections and depressions formed to imitate leather.

5. A hollow rubber football of the color of tanned leather, finished on the exterior physically to imitate leather, and adapted to be closed to contain internal gaseous pressure.

6. A football having an integral rubber wall adapted to contain internal pressure and having an imitation of the lacing characteristics of a leather football.

7. A hollow rubber football finished on the exterior physically to imitate a leather football, and having a valve through which the ball may be inflated, and having on opposite sides of the valve raised and depressed portions imitative of lacing.

8. A football of the character described, consisting of a hollow rubber article whose walls are resilient and impervious and have an exterior surface corresponding to the reverse of natural leather.

9. A football having an integral rubber wall adapted to contain internal pressure and having an imitation of leather gores and the lacing characteristics of a leather football, and a valve surrounded by an internal reinforcement and vulcanized in place.

Signed at Tuckahoe, New York.

FRED THOMAS ROBERTS.
WILLIAM E. ROBERTS.